United States Patent [19]
Clanin

[11] Patent Number: 5,285,808
[45] Date of Patent: Feb. 15, 1994

[54] DIVERTING RELIEF VALVE BACKFLOW

[75] Inventor: William B. Clanin, Fresno, Calif.

[73] Assignee: Clanin & Associates, Fresno, Calif.

[21] Appl. No.: 972,238

[22] Filed: Nov. 5, 1992

[51] Int. Cl.⁵ .......................................... G05D 11/03
[52] U.S. Cl. .................................. 137/114; 137/217; 137/895
[58] Field of Search ............... 137/114, 117, 217, 218, 137/895; 417/299

[56] References Cited
U.S. PATENT DOCUMENTS

| | | | |
|---|---|---|---|
| 2,459,000 | 1/1949 | Morris | 137/117 X |
| 2,862,513 | 12/1958 | Mercier | 137/117 |
| 3,010,467 | 11/1961 | Stenberg | 137/217 |
| 3,482,405 | 12/1969 | Sansevero | 137/117 X |
| 4,231,386 | 11/1980 | Braukmann | 137/117 |
| 4,820,408 | 4/1989 | Sandig | 137/895 X |
| 5,133,498 | 7/1992 | Sealy | 137/217 X |

Primary Examiner—Robert G. Nilson
Attorney, Agent, or Firm—Fish & Richardson

[57] ABSTRACT

Apparatus for diverting backflow includes a housing having first and second pressure openings for receiving fluid signals representative of first and second pressures. The housing has a gas inlet and a gas outlet and is formed with a gas transmission passage for carrying gas from the gas inlet to the gas outlet. The housing has a vent passage communicating with the gas passage and the region outside the vent passage for carrying fluid from the gas passage to the region outside said housing. Valve structure movable in the housing is responsive to the difference in pressures at the first and second pressure openings for blocking fluid flow between the gas passage and the vent passage when the pressure difference is greater than a predetermined value and allowing fluid flow from the gas passage to the vent passage when the pressure difference is below a predetermined value.

11 Claims, 3 Drawing Sheets

DIVERTING RELIEF VALVE BACKFLOW

The present invention relates in general to diverting backflow and more particularly concerns novel apparatus and techniques for diverting backflow from a relief valve, such as in a line carrying chlorine to a water supply.

Chlorine or other disinfectant is often introduced into water to reduce contamination. A typical chlorinating system includes a venturi in the water line which draws chlorine from the chlorine feed line into the flowing water. Typically an ejector booster pump creates a pressure differential that helps draw chlorine into the flowing water, and a check valve blocks flow of water into the chlorine vacuum gas line when the booster pump is not operating. When the check valve fails, the pressure in the water line can force water through the chlorine supply line into the chlorine vacuum regulator head, causing damage to the head.

According to the invention, upon loss of booster pump pressure and failure of the check valve, a path opens through which water leakage diverges from the chlorinating tube through a waste vent.

Apparatus according to the invention includes a piston responsive to the pressure difference of water against first and second piston faces. Normally the piston keeps the path from the chlorine vacuum regulator head through the injector into the water line intact. When the injector or the pump fails, the pressure difference on the first and second piston faces reduces, causing the piston to move so as to close the path to the chlorine source and open the path to the waste vent.

Other features and advantages of the invention will become apparent from the following detailed description when read in connection with the accompanying drawings in which.

Figure 1:
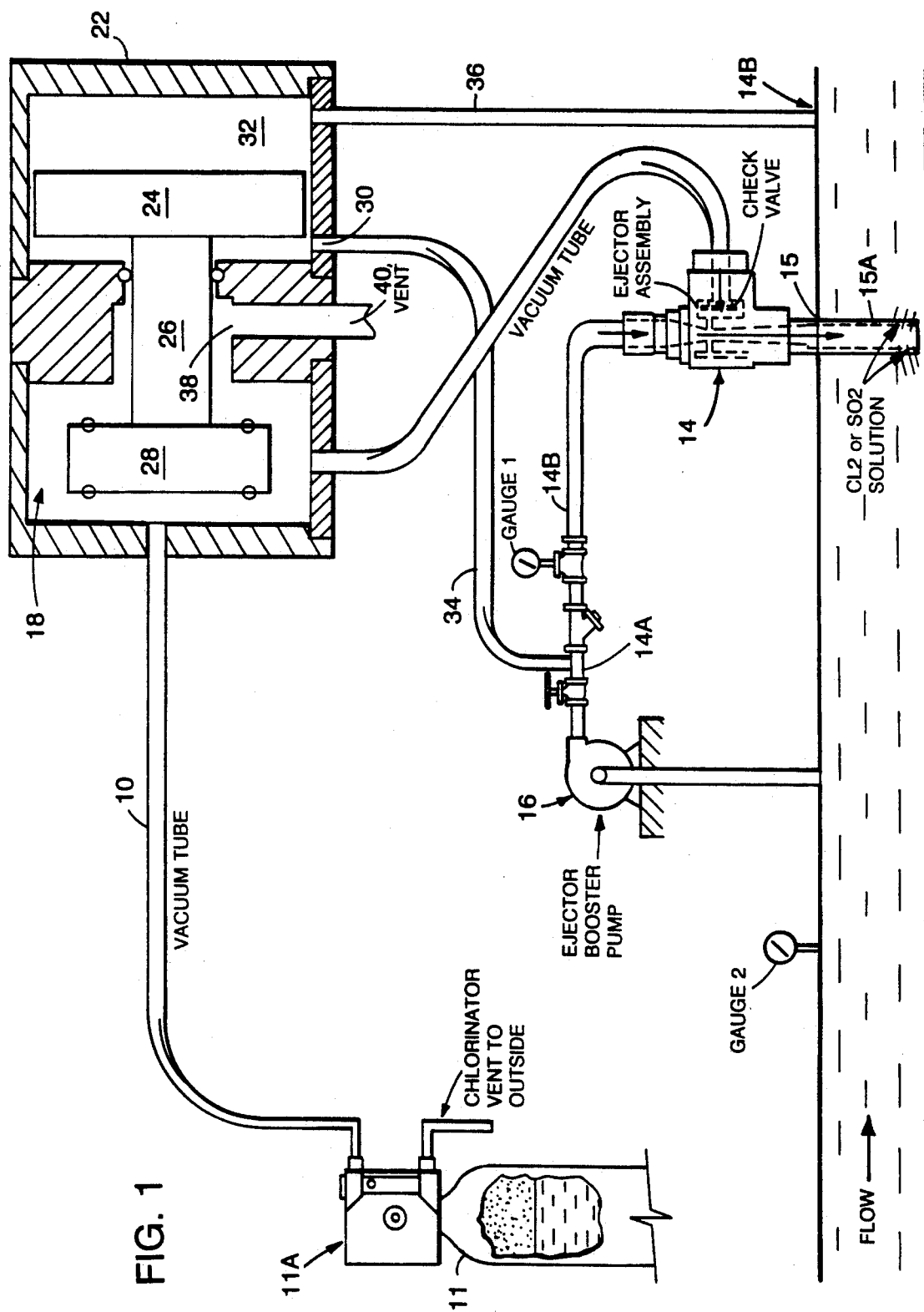
FIG. 1 is a combined pictorial-diagrammatic representation of a system according to the invention.
Figure 2:
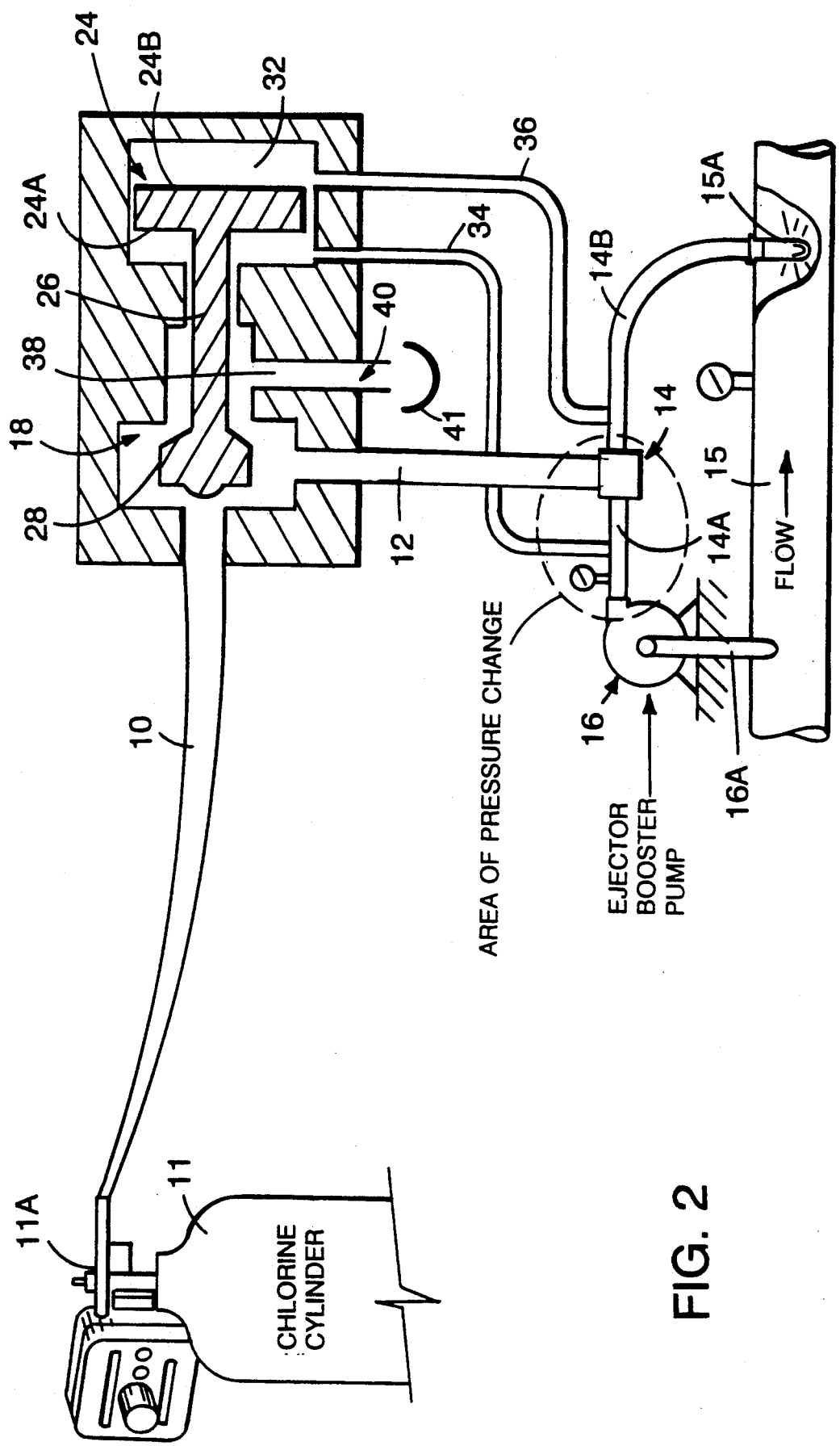
FIG. 2 is a pictorial diagrammatic view of a variation of the embodiment of the invention shown in FIG. 1.

With reference now to the drawing and more particularly FIGS. 1 and 2, there are shown combined pictorial-diagrammatic views of systems according to the invention. Chlorine from chlorine cylinder exits chlorine vacuum regulator head 11A and enters chlorine input tube 10 normally passing through space 18 to outlet chlorine tube 12 to venturi device 14. Venturi device 14 also receives water from ejector booster pump 16 through input line 14A drawn from water pipe 15 through tube 16A. Venturi device 14 provides chlorinated water further downstream in pipe 15 through outlet tube 15A having a check valve and diffuses. In the absence of the invention, with booster pump off, failure of this check valve could allow line pressure water to flow from pipes 14A and 14B into tube portions 12 and 10 into vacuum regulator head 11A.

Pressure sensing tubes 34 and 36 connected to inlet tube 14A and outlet tube 14B, respectively, are connected to openings 30 and 32 on opposite sides of piston head 24 having faces 24A and 24B, respectively, with piston rod 26 connecting piston head 24 to valve seal 28. The cylindrical chamber of cylinder 18 has an O-ring seal 22 and opening 38 connected to vent tube 40. As can be seen, the valve structure comprising piston rod 26 and associated structure is free of springs.

Having described the physical arrangement of the systems, the mode of operation will be explained. During normal operation, the ejector booster pump 16 boosts the water pressure in the venturi device 14. This pressured flow creates a vacuum in outlet chlorine tube 12, and chlorinated water flows through outlet tube 14B through outlet 15A into water pipe 15. The booster-injector-pump-induced pressure at opening 30 is then greater than that at opening 32. This pressure differential across piston head faces 24A and 24B causes the assembly including rod 26 and valve seat 28 to move to the right, allowing chlorine to flow through chlorine input tube 10 and chlorine output tube 12 into venturi device 14. With ejector booster pump 16 not operating, the pressure differential decreases, causing the assembly of piston head 24, rod 26 and valve seat 28 to move to the left, blocking the passage to the chlorine inlet tube 10 so that leaking water escaping around the check valve is diverted through outlet 38 and vent 40. This water may be collected in container 41 to provide an indication of a failed check valve. Piston and rod seals are close tolerance.

Referring to FIG. 1, there is shown a diagrammatic-pictorial view of a variation of the embodiment of FIG. 2 with a longitudinal sectional view and associated components shown in slightly different form with pressure sensing tube 36 connected to pipe 15 at 14B' downstream from outlet 15A. The same reference symbols identify corresponding elements throughout the drawing.

Figure 3:
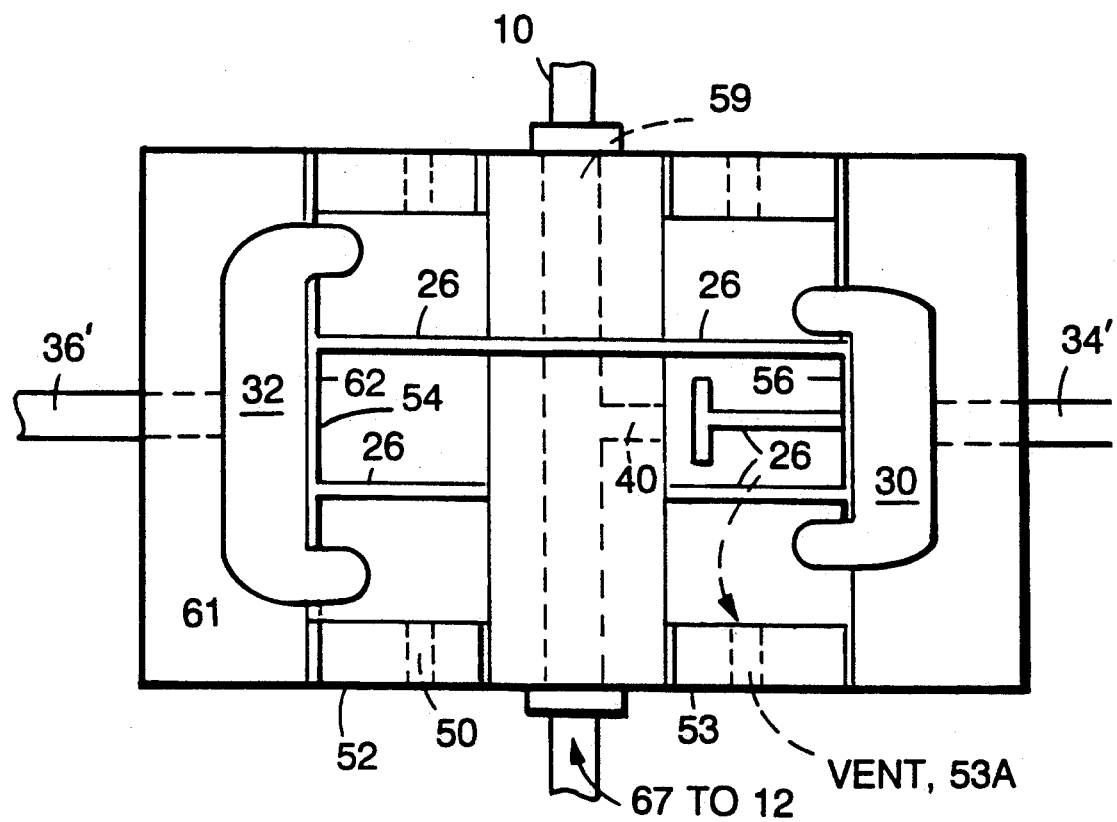
FIG. 3 is a diagrammatical sectional view of key structure in an alternative embodiment of the invention using diaphragms.

With reference to FIG. 3, there is shown a diagrammatic longitudinal sectional view of an alternative embodiment of the cylindrical structure using diaphragms instead of the cylinder heads, piston rod, valve seat shown in FIGS. 1 & 2. This structure typically may comprise a plastic block formed with cavities that accommodate diaphragms. Annular cylinders 52 and 53 serve as diaphragm seals and are perforated with openings such as 50A and 53A for breathing. Piston 54 is connected to annular diaphragm 56 by separator rods 26 to piston 62 which is connected to annular diaphragm 61. Valve seat 57 is connected by rod 57A to piston 54 for sealing vent 58 that breaks the integrity of tube opening 59. Cavities 30 and 32 accommodate movement of diaphragms 56 and 61, respectively. Openings 34' and 36' are connected to tubes 34 and 36, respectively (FIG. 1). As can be seen, the valve structure comprising piston 54 and associated components is free of springs.

Inlet 59 is connected to tube 10 from regulator 11A, and outlet 67 is connected to tube 12. When the pressure from line 34 is greater than that from line 36, valve 25 moves to close vent 40, and chlorine may be drawn through passage 59 from tube 10 to tube 12. As the difference in pressure between lines 34 and 36 decreases, valve rod 26 moves to the right, opening vent 40 and allowing any backflow due to injector check valve failure, whether chlorine gas or water, to escape through vent 49 and openings 50A, 53A.

Briefly reviewing the invention, a pressurized water system sometimes receives chlorine gas or other chemical. The system may not receive chemical continuously because the well may stop or the flow may stop, but the system remains under pressure.

When the pressurized system is at rest with no chlorine being added by ejector booster pump 16, the pressure is the same at pressure sensing tubes 34 and 36. If the check valve is faulty and booster pump is off, water may be forced through the chlorine vacuum tube 10 and damage the vacuum regulator head 11A.

When the ejector booster pump 16 is operating and pressure in tube 34 is typically 20 or more psi higher than the pressure in tube 36, venturi action causes chlorine to enter the water system. The problem solved by the invention usually occurs when these pressures are equal because there is no vacuum at the check valve which is near the venturi, and water may leak through the check valve into chlorine line 12. The invention uses these two pressures to open the vacuum tube, allowing any water leakage past the check valve to dribble out vent 40. When the pressures differ, valve structure moves to seal off the vent so that chlorine can be drawn from chlorine cylinder 11 and ejected into the water system.

In one aspect of the invention shown in FIG. 1 there are two piston faces, a piston and a "hole closer" or vent seal as described above. In the alternate embodiment of FIG. 3 there are two different-sized diaphragms that work against each other. With equal pressure on both diaphragms, the larger diaphragm overpowers the smaller, and opens the bypass to the vent port. With the booster pump activated, the smaller diaphragm overpowers the larger diaphragm and moves to close the bypass tube vent 40.

The foregoing describes apparatus and techniques for diverting check valve leakage in order to protect the vacuum equipment. The invention is advantageous in diverting check valve leakage and allowing deposited backflow to be used as an indication of a failed check valve at venturi device 41. Structure embodying the invention is relatively easy and inexpensive to fabricate and operates reliably.

Other embodiments are within the claims.

What is claimed is:

1. Apparatus for diverting check valve leakage comprising,
   a housing having first and second pressure inlets for receiving fluid signals representative of first and second pressures,
   said housing having a gas inlet and a gas outlet and formed with a gas transmission passage for carrying gas from said gas inlet to said gas outlet,
   a check valve coupled to said gas outlet for normally preventing liquid from entering said gas outlet while allowing gas exiting through said gas outlet to pass through said check valve,
   said housing having a vent passage communicating with said gas transmission passage and the region outside said housing for carrying liquid leaking through said check valve from said gas transmission passage to the region outside said housing,
   valve structure movable in said housing responsive to the difference in pressures at said first and second pressure inlets for blocking fluid flow between said gas transmission passage and said vent passage when said pressure difference is greater than a predetermined value and allowing fluid flow, including any liquid leaking through said check valve entering said gas transmission passage through said gas outlet, from said gas transmission passage to said vent passage when said pressure difference is below a predetermined value,
   wherein said value structure is free of springs.

2. Diverting apparatus in accordance with claim 1 wherein said valve structure is formed with a sensing chamber having said first and second pressure inlets,
   said valve structure comprises a piston head, a valve seat inside said gas passage and a rod interconnecting said valve seat and said piston head,
   whereby said valve seat engages the entrance to said vent passage when said pressure difference is greater than said predetermined value and is spaced from said entrance passage when said pressure difference approaches zero.

3. Diverting apparatus in accordance with claim 2, wherein said valve seat blocks flow between said gas inlet and said gas passage when said pressure difference is less than said predetermined value.

4. Apparatus for diverting check valve leakage comprising,
   a housing having first and second pressure inlets for receiving fluid signals representative of first and second pressures,
   said housing having a gas inlet and a gas outlet and formed with a gas transmission passage for carrying gas from said gas inlet to said gas outlet,
   said housing having a vent passage communicating with said gas transmission passage and the region outside said housing for carrying fluid from said gas transmission passage to the region outside said housing,
   valve structure moveable in said housing responsive to the difference in pressures at said first and second pressure inlets for blocking fluid flow between said gas transmission passage and said vent passage when said pressure difference is greater than a predetermined value and allowing fluid flow from said gas transmission passage to said vent passage when said pressure difference is below a predetermined value,
   wherein said valve structure comprises first and second diaphragms coupled to said first and second pressure inlets, respectively,
   a mechanical linkage interconnecting said first and second diaphragms,
   said mechanical linkage having a valve seat for preventing flow in said vent passage when said pressure difference is greater than said predetermined value and allowing fluid flow from said gas passage to the region outside said housing through said vent passage when said pressure difference approaches zero.

5. Diverting apparatus in accordance with claim 4, wherein said housing is formed with first and second diaphragm cavities coupling said first and second pressure inlets to said first and second diaphragms, respectively.

6. Diverting apparatus in accordance with claim 5 wherein said valve structure further comprises first and second end elements connected to said first and second diaphragms, respectively, interconnected by at least one connecting rod comprising said mechanical linkage,
   said valve seat being connected to said connecting rod.

7. Diverting apparatus in accordance with claim 6, wherein said housing is formed with first and second cylindrical rings to which said first and second diaphragms are respectively attached and formed with openings to the region outside said housing comprising said vent passage.

8. Apparatus in accordance with claim 7 and further comprising,
  a source of gas having a gas regulating valve,
  an input conduit connecting said gas regulating valve to said gas inlet,
  a venturi device having a liquid inlet, gas inlet and outlet,
  an output gas conduit coupling said gas outlet to the gas inlet of said venturi device,
  a first pressure conduit coupling the liquid inlet of said venturi device to said first pressure inlet,
  and a second pressure conduit coupling the outlet of said venturi device to said second pressure inlet.

9. Apparatus in accordance with claim 8 and further comprising,
  a liquid conduit having first and second fluid taps spaced along the length of said fluid conduit,
  an ejector booster pump having an inlet connected to said first tap for drawing fluid from said fluid conduit and an outlet coupled to the fluid input of said venturi device,
  and an output conduit coupling the output of said venturi device to said second tap,
  and a check valve for allowing flow of gas through said venturi device into said fluid conduit while normally preventing fluid flow from said fluid conduit into the gas outlet conduit,
  whereby failure of said check valve in a line pressure at or near zero pressure difference between said first and second taps may allow water intrusion to affect the vacuum regulator.

10. Apparatus in accordance with claim 9 wherein said fluid conduit carries water and said gas source is a source of purifying gas for reducing contamination of said water.

11. Apparatus for diverting check valve leakage in accordance with claim 4 wherein said valve structure is free of springs.

* * * * *